H. W. RUSSELL.
Meat and Vegetable Chopper.
No. 52,449. Patented Feb. 6, 1866.
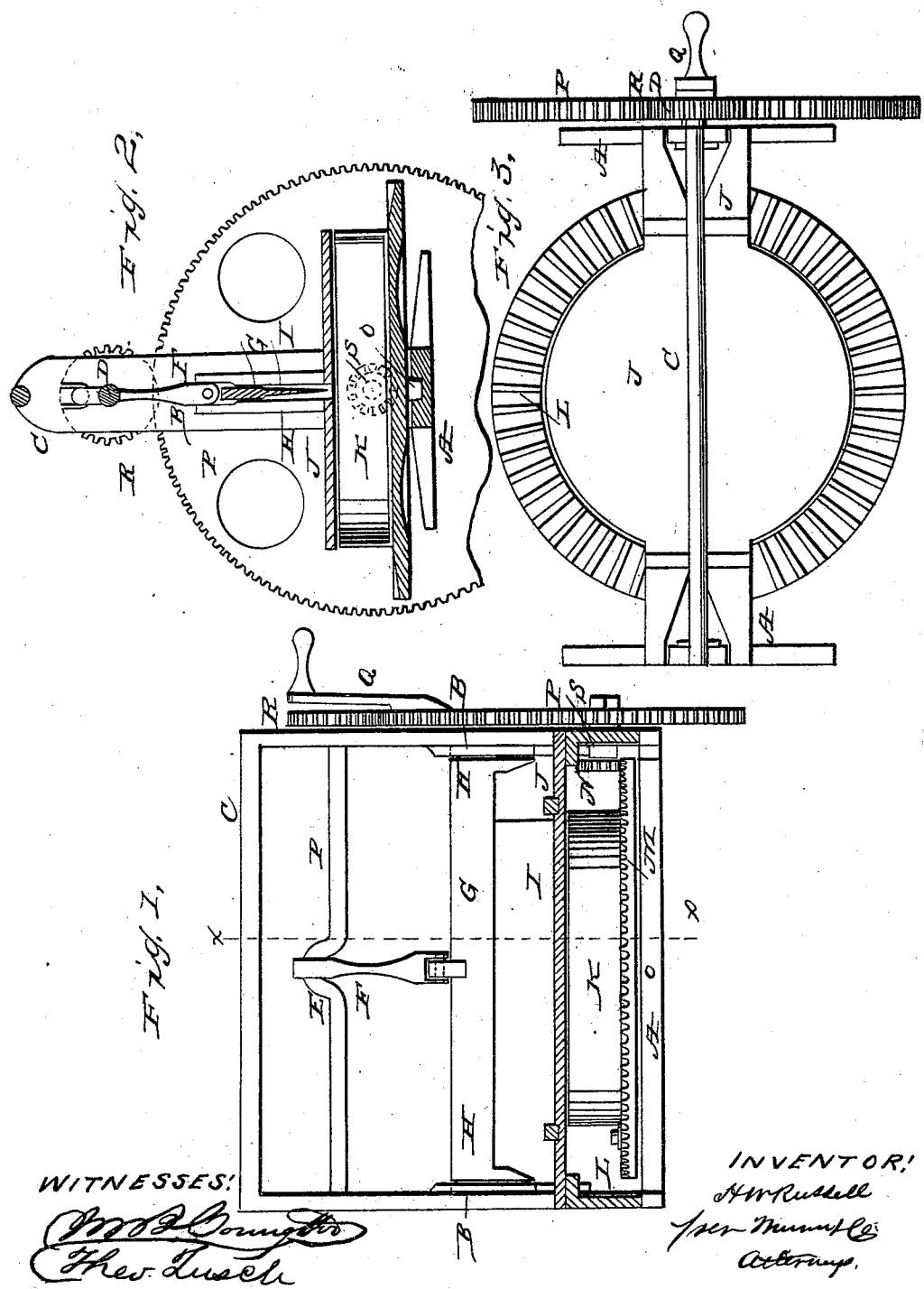
WITNESSES:
INVENTOR:
H W Russell

UNITED STATES PATENT OFFICE.

HENRY W. RUSSELL, OF STOUGHTON, MASSACHUSETTS.

MEAT AND VEGETABLE CHOPPING MACHINE.

Specification forming part of Letters Patent No. 52,449, dated February 6, 1866.

*To all whom it may concern:*

Be it known that I, H. W. RUSSELL, of Stoughton, in the county of Norfolk and State of Massachusetts, have invented a new and useful Improvement in Chopping-Machines; and I do hereby declare that the following is a full, clear, and exact description thereof, which will enable others skilled in the art to make and use the same, reference being had to the accompanying drawings, forming part of this specification, in which—

Figure 1 is an elevation of a chopping-machine made according to my invention. Fig. 2 is a vertical section taken on the line $x$ of Fig. 1, part of the driving-wheel being broken away. Fig. 3 is a plan.

The object of this invention is to provide a chopping-machine for family use.

It consists, in general terms, in a vertically-reciprocating knife which works through the cover of a vessel which has rotary motion in a horizontal plane.

The same power which drives the knife gives rotary motion to the vessel. The latter contains the meat or vegetables to be cut, and as it revolves its contents are exposed at a different place to the action of the knife, which always descends in the same plane.

A designates the bed of the machine. B B are two standards which rise therefrom at opposite sides, and are connected at top by a rod, C.

P is a driving-wheel with a geared periphery, which meshes with a smaller gear-wheel, R, placed vertically above it.

The wheel P is fixed on a short shaft, S, which has bearings in one of the standards B, not far above the bed-plate A.

The gear-wheel R is fixed on one end of a shaft, D, which extends from one standard to the other. This shaft D at the middle of its length is formed into a crank, E, to which is attached a pitman, F, whose lower end is hinged to the upper edge of the shank G of a knife, I, which hangs down in a vertical direction.

The ends of the shank G of the knife work in vertical guides H H, fixed on the inside faces of the standards B B.

L is a horizontal plate, of circular form, around whose edge is formed a series of cogs like those on a crown-wheel. These cogs are engaged by the pinion N on the inner end of the short shaft S, which is the driving-shaft of the machine. This plate has on its under side a center-pin, O, which is stepped in the bed-plate A. The plate turns on said pin.

K is a circular vessel, which is fitted upon the rotating plate L, and is held in place thereon by any suitable means so as to turn with it. This vessel receives the meat, vegetables, or other articles to be cut up.

J is a slotted plate, the body of which is circular, so as to cover the vessel K. Its ends are supported in any suitable way on the bottom plate, being in this example turned down at right angles toward the bottom plate. The body of the slotted plate extends over the vessel K, so as to cover its contents. Its slot is of a length to receive the whole length of the reciprocating knife 1, which moves up and down through it to reach the contents of the vessel K. The length of the knife or the length of the stroke are to be adapted to the depth of the vessel K.

Any article which can be cut up by a knife may be chopped by the use of this apparatus. It is well adapted to chop sausage-meat, mince-meat, apples, and all other articles which are ordinarily used in families.

Its operation is easily understood by the most careless servant or house-keeper. When it is desired to have access to the vessel K the knife is raised to its highest position, so as to allow the cover or plate J to be raised, when the vessel is taken off its bed-plate L. If, now, any article to be chopped is placed in it, and the vessel is put back on the plate L, the cover is allowed to fall to its place, and the machine is ready to be operated. The wheel P is next turned by its crank, when the pinion N gives rotary motion to the geared plate L, which carries the vessel K around with it, and at the same time the knife I is made to reciprocate through the slotted cover J, and at each descent it strikes and cuts the contents of the vessel K at a different place. The operator, therefore, has no trouble to turn the contents of the vessel by hand in order to expose the same to the knife, but that office is performed automatically by the machine.

I claim as new and desire to secure by Letters Patent—

The arrangement of the gear-wheel R, shaft D, crank E, pitman F, and reciprocating knife I, in combination with the pinion N, shaft S, rotating plate L, and vessel K, operated from the same driving-wheel, P, in the manner as herein described.

HENRY W. RUSSELL.

Witnesses:
J. H. HORN,
G. F. SMITH.